Dec. 1, 1942.  A. EISELE  2,303,530
GAUGE
Filed March 27, 1942
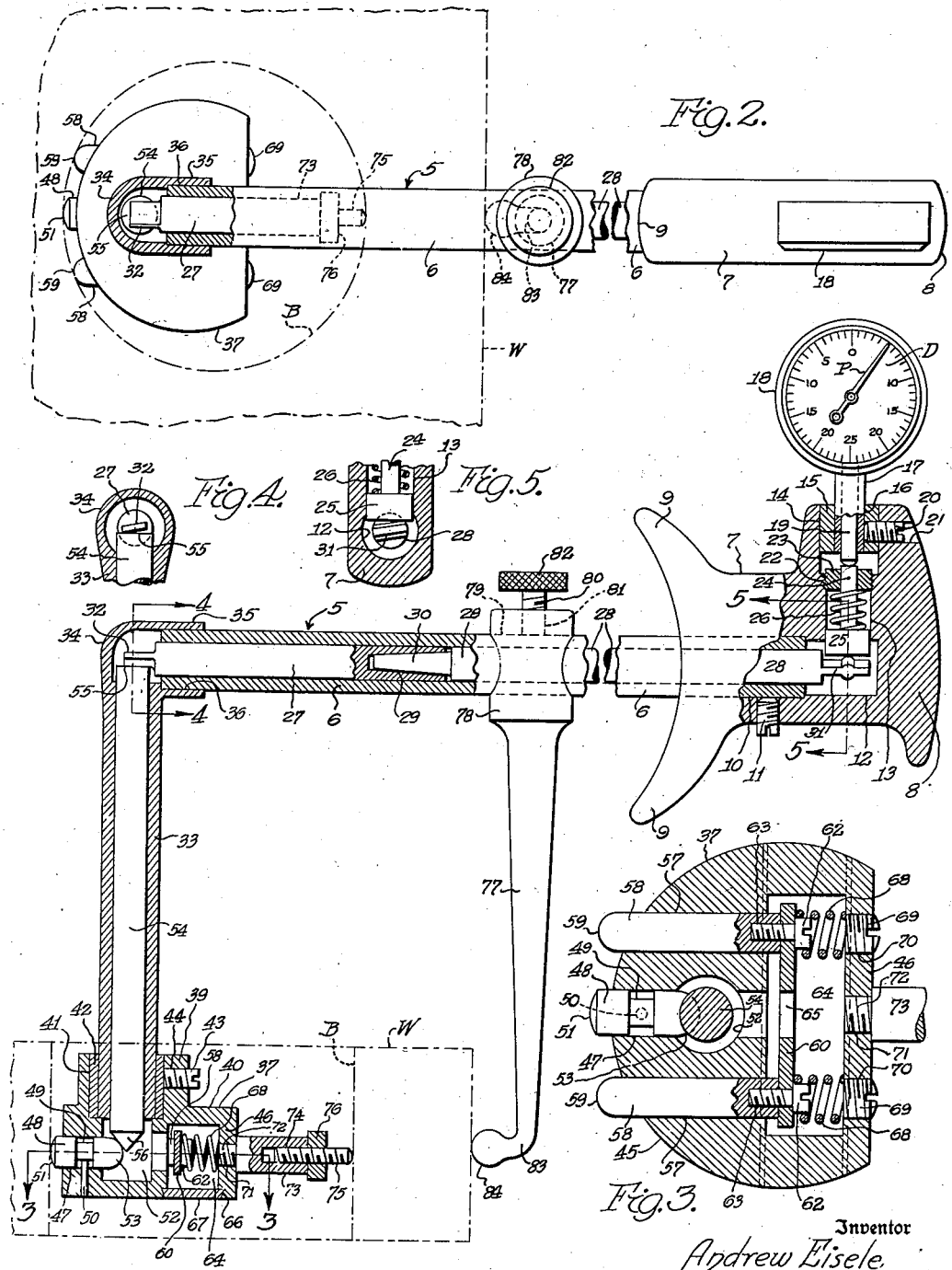
Inventor
Andrew Eisele
By
Barthel & Bugbee
Attorneys Patented Dec. 1, 1942

2,303,530

UNITED STATES PATENT OFFICE 2,303,530

GAUGE

Andrew Eisele, Detroit, Mich.

Application March 27, 1942, Serial No. 436,461

10 Claims. (Cl. 33—147)

The present invention relates to improvements in gauges and more particularly to gauges for testing or checking internal dimensions.

The primary object of the invention is to provide an internal gauge of the above mentioned type having a feeler member which may be rotated relative to the handle and gauge indicator to facilitate the insertion of the gauge in difficult bores or positions ordinarily inaccessible with gauges of ordinary construction.

Another object of the invention is to provide a gauge having a feeler member which is operatively connected to the gauge indicator by means of a pair of rods mounted at right angles to each other and disposed so that the feeler member may be adjusted to any desired rotational position without offsetting the indicator or affecting the same in any way whatsoever.

Another object of the invention is to provide an internal gauge in which one of the operating rod members is separably connected so that it may be removed and the parts adjusted to facilitate rotational adjustment of the feeler member with respect to the indicator.

Another object of the invention is to provide an internal gauge which may be taken apart to facilitate easy storage and packing during shipping.

Other objects and advantages of the invention will become apparent during the course of the following description of the accompanying drawing wherein:

Figure 1 is a side elevational view partly broken away to illustrate in detail the feeler member and its association with one of the operating rods connecting the gauge indicator;

Figure 2 is a top plan view showing portions of the indicator broken away and illustrating in detail the position of the feeler member;

Figure 3 is a horizontal cross sectional view taken on line 3—3 of Figure 1 looking in the direction of the arrows illustrating in detail the construction of the feeler member;

Figure 4 is a vertical cross sectional view taken on the line 4—4 of Figure 1 looking in the direction of the arrows showing the manner in which the rods are connected for transmitting motion from the feeler member to the gauge indicator, and Figure 5 is a vertical cross sectional view taken on line 5—5 of Figure 1 looking in the direction of the arrows illustrating in detail the plunger for transmitting motion from the angularly disposed rods to the indicator.

General arrangement

The invention comprises a relatively long shank member on one end of which is provided a pistol grip handle supporting an indicator member, while the opposite end is provided with a tubular member rotatably carried thereby. Extending through the shank portion there is provided an operating rod divided intermediate its ends so that it may be separably connected. The tubular rotatable member carries a feeler member having a work surface contact pin for imparting longitudinal motion to a rod mounted within the rotatable tubular member. Said rod is connected or presented to a projection formed on the end of the separable rod extending through the tubular shank so that vertical movement of one of the rods will effect rotational movement of the other rod which is connected to the indicator to deflect the needle thereof by a projection thereon engaging a spring loaded plunger beneath said indicator. The feeler member likewise has spring loaded plungers on opposite sides of the contact member to assist in centering said contact member and an adjustable contact is mounted in opposed relation from the movable contact to engage the opposite wall of an internal surface. An additional contact member is slidably mounted on the shank of the gauge so that the gauge may be converted for measuring external surfaces and dimensions.

Detailed description

In the drawing, wherein for the purpose of illustrating the invention in detail and wherein like reference characters will be employed to designate like parts throughout the same, the reference character 5 will generally be employed to designate an internal gauge comprising a relatively long tubular shank member 6, one end of which is provided with a pistol grip handle 7 having a rear butt portion 8 and finger receiving wings 9 forwardly thereof. The tubular shank 6 extends into a bore 10 formed in the handle 7 and is anchored in place by means of a set screw 11. The bore 10 extends rearwardly and is reduced as at 12 where it extends axially as at 13 and terminates in an enlarged bore 14. Mounted in the bore 14 is a plug 15 having a central bore 16 for receiving the stem guide 17 of a gauge indicator 18 so that the stem 19 of said indicator may project downwardly into the bore 14. A set screw as at 20 extends through a threaded opening in the plug 15 and is insertable through a bore 21 formed in the butt 8 of the pistol handle grip.

Mounted in the upper threaded end of the bore 13 as at 22 is a plug 23 suitably threaded therein, and said plug 23 is adapted to guide a spring loaded plunger 24 so that the upper end will be engaged by the indicator stem 19, while the lower headed portion 25 will project into the reduced bore 12. A coil spring 26 has one of its ends engaging the screw threaded guide plug 23, while the opposite end abuts the headed portion 25 of the plunger 24.

Extending through the tubular shank 6 is a rod for transmitting motion to the gauge indicator 18 and said rod comprises separably connected sections 27 and 28 connected by a snug male and female joint intermediate the ends of the rod formed by providing a conical bore 29 in one end of the rod 27 for receiving a conical pin 30 formed on the other rod 28. The rods 27 and 28 may be forced together to frictionally hold the same in position with respect to each other and the free end of the rod 28 is provided with a flat projection 31 adapted to rest under the headed portion 25 of the spring loaded plunger 24, while the opposite end of the rod 27 is provided with a similar projection 32 which is relatively flat and extends across the diameter of said rod 27.

Rotatably mounted on the outer end of the tubular shank 6 is a feeler member supporting tube 33, one end of which is provided with an elbow 34 the end of which as at 35 being frictionally secured to the tubular shank 6 by means of an axial bore 36. The axial bore is machined to receive the outer end of the tubular shank 6 so that there will be provided a snug fit to prevent accidental displacement of the parts unassembled. The free end of the tubular feeler supporting member 33 is adapted to support a rounded head 37 in which is mounted the feeler contact member which will be presently described.

The rounded feeler contact supporting head 37 is provided with an upstanding tubular boss 39 on the top wall thereof as at 40, and said tubular boss has formed centrally therein, a bore 41 for receiving a friction sleeve 42 adapted to be clamped about the lower end of the tubular feeler member support 33 by means of a set screw 43 extending through a threaded opening 44 in the tubular boss 39 so that said set screw will engage the friction sleeve 42 and securely clamp the contact feeler member 37 in an adjusted position relative thereto. By loosening the screw 43 the rounded head 37 may be rotated about the axis of the tubular feeler member support so that the head may be disposed in any desired position relative to the shank 6 and the handle 7. The feeler contact member 37 is provided with a rounded vertical wall 45 connecting a diametric wall 46 in the rear thereof and extending inwardly from the rounded vertical wall 45 is a radial bore 47 in which is located a feeler contact 48 having a central reduced portion 49 for receiving one end of a pin 50 for preventing displacement of said contact pin. The outer end of the contact pin 48 is well rounded as at 51 to provide a feeler contact portion adapted to engage the work W within an internal bore B formed therein. The opposite end of the feeler contact extends into a bore 52 communicating with the bore 41 and reduced greatly in size to provide sufficient space for the rounded inner end 53 of the feeler contact 48 to operate. Extending downwardly through the tubular feeler contact supporting member 33 is a rod 54 mounted for reciprocation therein and the upper end of said rod is flattened as at 55 and is presented to the projection 32 on the rod 27, while the lower end of said rod 54 is pointed or cone-shaped to engage the inner rounded end 53 of the feeler contact 48, whereby inward movement of the feeler contact 48 will effect a vertical movement of the rod 54 resulting in a rotational movement of the rod sections 27 and 28 and thereby producing an indication on the gauge indicator 18.

Extending inwardly from the rounded wall 45 of the contact head 37 and on opposite sides of the contact feeler 48 are parallel bores 57 for receiving centering plungers 58, the outer ends of which are rounded as at 59 for engaging the bore B of the work, thereby centering the feeler contact head and the inner ends of the plungers 58 are connected by a cross bar 60 fastened in place by machine screws 62 extending through the ends thereof and anchored in threaded bores 63 in the ends of the plungers. Said cross bar 60 operates in an elongated chamber 64 which communicates with the vertical bore 52 by means of a radial bore 65. The chamber 64 is open on its under side and is closed by a sliding closure plate 67 having the edges thereof beveled for being received in undercut guide edges 66 so that the sliding cover 67 may be removed for the purpose of repairing the parts within the contact feeler head.

Coil springs 68 have one of their ends encircling the heads of the machine screws 62, while the opposite ends are engaged by screw threaded plugs 69 disposed in axial alignment therewith and threaded in bores 70 in the rear wall of the feeler contact head 37 as at 46.

Mounted between the screw threaded plugs 69 and within a bore 71 is the threaded end 72 of a rod 73, and said threaded end 72 is received in suitable threads formed in the bore 71. An axial threaded bore 74 is formed in the outer end of the rod 73 for receiving an adjustable screw rod 75 adapted to be held in a predetermined adjusted position by means of a lock nut 76 threaded thereon in clamping engagement with the outer end of the rod 73.

A contact member 77 depends from the tubular shank 6 and has the upper end formed with an enlarged boss 78 provided with a transverse bore 79 so that the contact member 77 may slide freely on said shank. A set screw 80 is threaded at right angles to the bore 79 and extends through a threaded opening 81 in the enlarged boss 78 so that the knurled head 82 may be turned to clamp the contact arm 77 in position along the shank 6. The lower end of the contact arm 77 is offset as at 83 and is formed with a spherical end 84 for engaging the outer circumference or surface of the work W.

*Mode of operation*

When using the gauge for determining internal diameters and the dimensions thereof, the rods 27 and 28 are separated and adjusted so that the projections 31 and 32 will be presented at the proper angle with respect to each other, which angle is predetermined by the rotational position to which the contact feeler head supporting rod 33 is positioned and adjusted. After such adjustment has been made, the contact feeler head 37 may likewise be adjusted rotationally about the tubular member 33 to facilitate the insertion of the contact feeler head 37 into disadvantageous positions with respect to the work.

When the parts of the gauge have been thus positioned, the feeler contact 48 will be urged inwardly when the gauge is inserted in the work and traversed over the face thereof wherein the rounded end 53 of the contact feeler 48 will engage the conical end 56 of the rod 54 and cause the same to be raised or lowered depending upon the in and out motion of the feeler contact 48. Such reciprocation of the rod 54 will partially rotate the separably connected rods 27 and 28 and transmit reciprocatory motion to the spring loaded plunger 24 and the gauge indicator stem 19 giving a reading upon the dial D of the gauge 18 which is graduated for registry with the pointer P. By adjusting the parts 27 and 28 in accordance with the desired angular position of the tubular member 33 and by likewise adjusting the contact feeler supporting head 37, a number of different angular relationships may be brought about and it will be found that the gauge can be used in locations in which other gauges cannot be inserted.

By rotating the contact feeler head 37 so that the contact feeler 48 is directly opposed to the spherical contact 84 it will be seen that the gauge may be used for calipering external surfaces in a like manner.

It is to be understood that the form of the invention herewith shown and described is to be taken as a preferred embodiment of the same and that various changes in the shape, size and arrangement of parts may be resorted to without departing from the spirit of the invention or the scope of the subjoined claims.

What I claim is:

1. An internal caliper gauge comprising a tubular shank, a handle mounted on one end of the shank for supporting a gauge indicator, a tubular member rotatably mounted on the free end of the shank, a feeler contact member carried by the free end of the tubular member and means for transmitting motion from the contact member to the indicator.

2. An internal caliper gauge comprising a tubular shank, an indicator located at one end of the shank, a tubular member rotatably supported on the opposite end of the shank, a feeler head supported by the tubular member, a feeler contact mounted in the feeler head and means for transmitting motion from the feeler contact to the indicator.

3. An internal caliper gauge comprising a tubular shank, a gauge indicator carried by one end of the shank, a tubular feeler head support rotatably mounted on the opposite end of the shank, a feeler head rotatably mounted on the feeler head supporting member, a feeler contact mounted in the feeler head and means for transmitting motion from the feeler contact to the indicator.

4. An internal caliper gauge comprising a tubular shank, a handle located on one end of the shank, a gauge indicator supported by the handle, a feeler head support rotatably mounted on the opposite end of the shank, a feeler head rotatably mounted on the free end of the feeler head supporting member, a feeler contact mounted in the feeler head and means for transmitting motion from the feeler contact to the indicator.

5. An internal caliper gauge comprising an elongated tubular shank, a gauge indicator supported on one end of the shank, a tubular feeler head support rotatably mounted on the opposite end of the shank, a feeler head rotatably mounted on the free end of the tubular feeler member support, a contact feeler disposed parallel to the shank and means for transmitting motion from the contact feeler to the indicator.

6. An internal caliper gauge comprising an elongated shank, a handle secured to one end of the shank, a gauge indicator carried by said handle, a tubular feeler head support extending at right angles to the shank and rotatably mounted thereon, a feeler head located on the free end of said feeler head support, a feeler contact movably mounted in the feeler head and means for transmitting motion from the feeler contact to the indicator.

7. An internal caliper gauge comprising an elongated tubular shank, a gauge indicator mounted on one end of the shank, a tubular feeler head support extending at right angles to the shank and rotatably mounted thereon, a feeler head rotatably secured to the free end of the tubular feeler head support, a feeler contact movably mounted in the feeler head, a reciprocating rod mounted in the tubular feeler head support and a rod extending through the shank having one end presented to the reciprocating rod and the opposite end presented to the gauge indicator.

8. A caliper gauge comprising an elongated shank, a gauge indicator mounted on one end of the shank, a feeler head support extending at right angles to the shank, a feeler head rotatably mounted on the feeler head support, a feeler contact movably mounted in the feeler head, a reciprocating rod extending through the feeler head support, a rocking rod extending through the tubular shank having one of its ends provided with a projection presented to the reciprocating rod and its opposite end provided with a projection presented to the indicator.

9. A caliper gauge comprising an elongated tubular shank, a handle formed on one end of the shank, a gauge indicator supported by said handle, a tubular feeler head support extending at right angles to the shank and mounted thereon for rotation relative thereto, a feeler head carried by the support, means for rotationally adjusting the head relative to the support, a feeler contact carried by the head, a reciprocating rod mounted in the support having a beveled end presented to the feeler contact, a rocking rod mounted in the shank having flat projections on the ends thereof, one of which is presented to the reciprocating rod and the other of which is presented to the indicator gauge so that deflections of the feeler contact will register on the indicator gauge.

10. An internal caliper gauge comprising an elongated tubular shank, an indicator gauge having its stem presented at right angles to the shank, a tubular feeler head support rotatably mounted on the opposite end of the shank and extending at right angles thereto, a feeler head mounted on the free end of the tubular feeler head support, a feeler contact mounted in the feeler head, a reciprocating rod mounted in the tubular feeler head support, a pair of separably connected rocking rods mounted in the shank for partial rotation therein having relatively flat projections at each end thereof, one of which is presented to the reciprocating rod and the other of which is presented to the stem of the gauge indicator.

ANDREW EISELE.